United States Patent [19]

Sumiya et al.

[11] Patent Number: 4,830,923

[45] Date of Patent: May 16, 1989

[54] MAGNETIC RECORDING MEDIUM

[75] Inventors: Kenji Sumiya; Yoshinori Yamamoto, both of Osaka; Shigeo Aoyama, Kyoto; Yoji Takeuchi, Osaka, all of Japan

[73] Assignee: Hitachi Maxell, Ltd., Osaka, Japan

[21] Appl. No.: 823,364

[22] Filed: Jan. 28, 1986

[30] Foreign Application Priority Data

Jan. 28, 1985 [JP] Japan .................... 60-14085
Jun. 26, 1985 [JP] Japan .................... 60-140080

[51] Int. Cl.⁴ .................................. G11B 5/70
[52] U.S. Cl. .................. 428/425.9; 427/128; 428/694; 428/900
[58] Field of Search .......... 428/694, 900, 425.9; 427/128

[56] References Cited

U.S. PATENT DOCUMENTS

| | | | |
|---|---|---|---|
| 4,521,486 | 6/1985 | Ninomiya | 428/900 |
| 4,526,837 | 7/1985 | Ohtsuki | 428/900 |
| 4,529,661 | 7/1985 | Ninomiya | 427/128 |
| 4,571,364 | 2/1986 | Kasuga | 428/900 |
| 4,600,521 | 7/1986 | Nakamura | 428/329 |
| 4,634,633 | 1/1987 | Ninomiya et al. | 428/900 |
| 4,637,959 | 1/1987 | Ninomiya et al. | 428/900 |
| 4,707,411 | 11/1987 | Nakayama | 428/900 |
| 4,731,292 | 3/1988 | Susaki | 428/900 |
| 4,743,501 | 5/1988 | Eguchi | 428/900 |

Primary Examiner—Paul J. Thibodeau
Attorney, Agent, or Firm—Birch, Stewart, Kolasch & Birch

[57] ABSTRACT

A magnetic recording medium comprising a substrate and a magnetic layer coated on the substrate which comprises a magnetic powder and a binder resin, wherein said binder resin comprises a modified polymer selected from the group consisting of a polymer having a backbone chain comprising a vinyl chloride/vinyl acetate/vinyl alcohol terpolymer and a polymer having a backbone chain comprising polyurethane to both of which a phosphoric acid group of the formula:

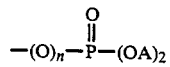

$$-(O)_n-\overset{O}{\underset{\|}{P}}-(OA)_2 \qquad (I)$$

wherein A is a hydrogen atom, an alkali metal atom or a hydrocarbon group, and n is 0 or 1 is bonded, the magnetic layer having improved surface smoothness, improved durability and excellent electromagnetic conversion characteristics particularly in the short wavelength range.

19 Claims, No Drawings

MAGNETIC RECORDING MEDIUM

FIELD OF THE INVENTION

The present invention relates to a magnetic recording medium such as a magnetic recording tape, a magnetic disc and a magnetic card.

BACKGROUND OF THE INVENTION

Generally, a magnetic recording medium comprises a substrate comprising of, for example, a polyester film and magnetic layer formed on the substrate by the application of a magnetic coating composition containing a magnetic powder and a binder resin on the surface of the substrate and drying the coated composition. In order to impart good electromagnetic conversion characteristics to the magnetic recording medium, it is necessary to improve the surface smoothness of the magnetic layer and also to increase the density of the magnetic powder in the layer. However, the surface smoothness and the density of the magnetic powder are influenced by the dispersibility and packing properties of the magnetic powder in the binder resin.

In addition, since the magnetic recording medium contacts objects at a very high rate including, e.g., a magnetic head, during recording and reproducing, the magnetic layer is required to have good durability.

Hitherto, various binder resins have been used for the magnetic recording medium including vinyl chloride/vinyl acetate type copolymers, poluyrethane resins, cellulose type resins, polyvinyl butyral resins, polyester resins, and the like. Among them, the vinyl chloride/vinyl acetate/vinyl alcohol terpolymer is preferably used due to the good dispersibility and packing properties of the magnetic powder therein.

Recently, improvement of the recording characteristics of a magnetic recording medium particularly in the short wavelength reange is made to satisfy the strong desire for high density recording. To this end, it is necessary to further improve the dispersibility of the magnetic powder in the binder resin to increase the surface smoothness and durability of the magnetic layer. However, none of the conventional binder resins satisfy this requirement.

It was also revealed that the dispersibility and packing properties as well as orientation of the magnetic powder in the binder resin are improved by incorporation of a hydrophilic polar group such as a carboxy group, a sulfonic acid group and a phosphoric acid group in the binder resin. Since the surface of the magnetic powder particle is generally hydrophilic due to the presence of highly polar hydroxyl groups or absorbed water, the affinity of the resin for an organic solvent due to inherent hydrophobic property of the resin and that for the magnetic powder due to the incorporated polar graoup can be well compromised so that above impovements are achieved (cf. The Journal of the Japanese Adhesive Association, Vol. 17, (1981) 155. It is also proposed to improve the dispersibility etc. of the magnetic powder in the binder resin by using, as the binder resin, a radiation curable resin having the above polar groups (cf. Japanese Patent Kokai Publication (unexamined) No. 79427/1984).

Although the incorporation of the polar group in the binder resin can improve the dispersibility and packing properties of the magnetic powder therein to some extent, the degree of the improvement greatly varies with the kind of the binder resin and the condition of incorporation of the polar group. Therefore, the polar group containing binder resin is not satisfactory and should be improved.

Japanese Patent Kokai Publication (unexamined) No. 20315/1985 discloses a modified polyurethane used as a binder resin for the magnetic layer, prepared by synthesizing a polyesterpolyol, incorporating a phosphorous compound of the formula:

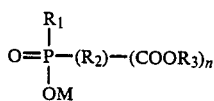

wherein $R_1$ is a hydrocarbon group or an ester-forming group such as a hydroxyl group, $R_2$ is a hydrocarbon group, $R_3$ is a hydrogen atom, a hydrocarbon group, an alkali metal atom or an ester-forming group such as a hydroxyl group, M is an alkali metal atom, and n is 1 or 2 to said polyesterpolyol through an ester bond, and then reacting the phosphorus compound incorporated synthesized compound with a polyisocyanate compound. However, such modified polyurethane does not satisfactorily improve the dispersibility of the magnetic powder in the binder resin.

SUMMARY OF THE INVENTION

One object of the present invention is to provide a binder resin which improves the dispersibility and packing properties of the magnetic powder therein.

Another object of the present invention is to provide a magnetic recording medium having a magnetic layer with improved surface smoothness and density of magnetic powder therein.

Further object of the present invention is to provide a magnetic recording medium having good durability and better recording characteristics in the short wavelength range.

DETAILED DESCRIPTION OF THE INVENTION

According to the present invention, these objects are achieved by a magnetic recording medium comprising a substrate and a magnetic layer coated on the substrate which comprises a magnetic powder and a binder resin, wherein said binder resin comprises a modified polymer selected from the group consisting of a vinyl chloride/vinyl acetate/vinyl alcohol terpolymer and polyurethane to both of which a phosphoric acid group of the formula:

wherein A is a hydrogen atom, an alkali metal atom or a hydrocarbon group preferably having 1 to 12 carbon atoms, more preferably 1 to 3 carbon atoms, and n is 0 or 1 is bonded.

When a resin which has been modified with a phosphoric acid compound is added as the binder resin to the magnetic layer, dispersibility and packing properties of the magnetic powder in the resin are more effectively improved than when an unmodified vinyl chloride/vinyl acetate type resin or the above described polar group containing binder resin is added. As a result of adding the modified resin, the magnetic layer has better surface smoothness and the density of the magnetic powder in the layer is increased. Consequently, the durability and electromagnetic conversion characteristics of the magnetic recording medium particularly to the short wavelength range are considerably improved.

In addition to the resin modified with the phosphoric ester, the magnetic coating composition may contain at least one of the conventional binder resins. In this case, the amount of the modified binder resin is preferably not less than 3% by weight, particularly not less than 10% by weight. When the amount of the modified binder resin is less than 3%, its effects are not sufficiently achieved.

Specific examples of the conventional binder agent co-usable with the modified binder resin according to the present invention are polyurethane resins, cellulose type resins, vinyl chloride/vinyl acetate type copolymers, polyvinylbutyral resins, polyester resins, and polyisocyanate compounds as cross-linking agents. Among them, polyurethane resins and trifunctiona isocyanate compounds having low molecular weights are preferred.

Because of the strong cross-linking capabilities as well as increases in the number of the cross-linking sites by the incorporation of the phosphoric acid group in the terpolymer or the polyurethane resin, the strength of the magnetic layer is greatly enhanced so that durability, heat resistance and chemical resistance of the magnetic layer are improved. Isocyanate compounds include compounds which have a trifunctional isocyanate group in the molecule. Such compounds may be prepared by reacting one mole of triol and three moles of diisocyanate. Commercially available trifunctional isocyanate compounds are Colonate L (by Nippon Urethane Industries), Desmodule L (by Bayer) and Takenate D102 (by Takeda Chemical Industries) and the like.

Preferably, 1 to 60 parts by weight of the isocyanate compound is used per 100 parts of the modified binder resin. When the amount of isocyanate compound is too large, the magnetic layer becomes too hard. The addition of the above amount of the isocyanate compound to the modified binder resin does not deteriorate the magnetic characteristics of the magnetic recording medium in the short wavelength range. Rather, it improves the magnetic characteristics of the recording medium. On the contrary, when the trifunctional isocyanate is mixed with the conventional binder resin such as the unmodified terpolymer or polyurethane, the recording characteristics of the magnetic recording medium in the short wavelength range tends to be deteriorated.

Generally, the modified terpolymer and the modified polyurethane have substantially the same effect. Particularly when improvement of the dispersibility and packing properties of the magnetic powder is intended, the former is preferably used. When improvement of the durability of the magnetic layer is intended, the latter is preferably used.

The modified binder resin used according to the present invention has a structure in which the phosphoric acid group of the formula (I) is bonded to the backbone chain of an unmodified terpolymer or unmodified polyurethane, which may be represented as follows:

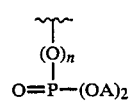

(II)

wherein A and n are as defined above.

In the case of the modified terpolymer, the phosphoric acid group is introduced by condensation reaction of at least a part of the hydroxyl groups of the vinyl alcohol repeating units with the phosphoric acid compound to form the following structure:

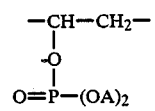

(III)

wherein A is as defined above.

The modification of the terpolymer may be carried out by reacting the unmodified polymer with the phosphoric acid compound. For example, the terpolymer is modified by reacting it with the phosphoric acid compound (e.g. phoshoric acid, phosphoric anhydride and phosphoryl chloride) in a suitable solvent (e.g. methyl isobutyl ketone) at a temperature of 40° to 110° C. optionally in the presence of a catalyst such as acetic acid, formic acid and boric acid. The proportion of each kind of repeating unit of the modified terpolymer is not critical. Particularly, the modified terpolymer having the total mole percentage of l, m and n in the following formula of 1 to 60% by mole is preferred:

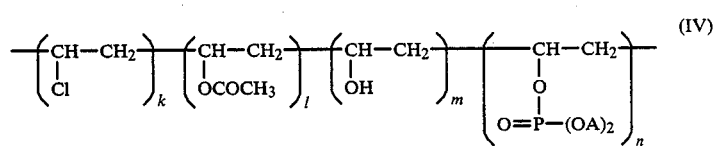

(IV)

is preferred. Among them, the modified terpolymer in which m+n is 0.5 to 20% by mole, particularly n is 0.1 to 5.0% by mole is more preferred.

Preferably, the substituent A is a hydrogen atom.

The number average molecular weight of the modified terpolymer is from 5,000 to 150,000.

Japanese Patent Kokai Publication (unexamined) No. 79427/1984 describes a kind of a terpolymer modified with phosphoric ester. However, the specifically disclosed terpolymers are those in which phosphorus atom of the phosphoric group is bonded to the backbone chain through a group of the formula: —O—R— wherein R is an alkylene group such as —CH$_2$— and —C$_2$H$_4$—, or a group having two urethane bonds and a residue of the formula: —R— wherein R is as defined above since the phosphoric acid group is incorporated by the dehydrogen chloride or a reaction through the diisocyanate compound. Therefore, those modified terpolymer are far different from ones used according to the present invention.

The modified polyurethane used according to the present invention may be prepared by reacting unmodified polyurethane with the phosphoric acid compound such as phosphoric acid, phosphoric anhydride, phosphoryl chloride and their derivatives in a suitable solvent (e.g. methyl isobutyl ketone, toluene and cyclohexane) at a temperature of 40° to 110° C. optionally in the presence of a catalyst (e.g. acetic acid, acetic anhydride, formic acid and boric acid).

In the modified polyurethane resin, the phosphoric acid group mainly bonds to the backbone chain through an ether linkage (namely, n=1 in the formula (I)) which is formed by condensation reaction of the hydroxyl group of the polyurethane and the phosphoric acid compound. The hydroxyl group is present not only at the terminal of the backbone chain but also the intermediate portions of the chain so that the phosphoric acid groups are introduced in the corresponding sites.

Since a hydrogen atom bonded to the nitrogen atom constituting the urethane bond of the polyurethane resin is active, it reacts with a molecule of phosphoric acid compound to form the phosphoric acid group in the phosphorus atom of which directly bonds to the backbone chain (n=0 in the formula (I)).

The modified polyurethane resin is derived from any one of reaction products of hydroxyl group containing compounds (e.g. polyesterpolyol, polyether polyol, arcylpolyol, castor oil, tall oil, poly-ε-caprolactone and their derivatives) and polyisocyanate.

Among the hydroxyl group containing compounds, polyesterpolyol is prepared by reacting a polybasic carboxylic acid with a polyhydric alcohol. Specific examples of the polybasic carboxylic acid are aliphatic dicarboxylic acids and anhydrides (e.g. succinic acid, adipic acid and sebacic acid), aromatic dicarboxylic acids and anhydrides (e.g. phthalic acid, terephthalic acid and their anhydrides), alicyclic dicarboxylic acids and anhydrides (e.g. tetrahydrophthalic anhydride, 3,6-endomethylenetetrahydrophthalic anhydride and tetrachlorophthalic anhydride), tricarboxylic acids (e.g. trimellitic acid, pyromellitic acid and their anhydrides). These carboxylic acids may contain an unsaturated dicarboxylic acids (e.g. maleic acid, fumaric acid, itaconic acid, citraconic acid and their anhydrides). Specific examples of the polyhydric alcohol are diols (e.g. ethylene glycol, diethylene glycol, 1,2-propylene glycol, dipropylene glycol, 1,3-butylene glycol, 2,3-butylene glycol, bisphenoldioxypropyl ether, neopentyl glycol, 1,4-butanediol and ε-caprolactam, glycerol and pentaerythritol).

Among the hydroxy group containing compounds, polyetherpolyol is prepared by polymerizing alkyleneoxide (e.g. ethyleneoxide and propyleneoxide). Acrylpolyol is prepared by reacting (meth)acrylic acid and a hydroxyl group containing monomer (e.g. 2-hydroxyethyl methacrylate, etc.).

Specific examples of the polyisocyanate compound to be reacted with the hydroxyl group containing compound are tolylenediisocyanate, diphenylmethanediisocyanate, naphthalenediisocyanate, p-phenylenediisocyanate, hexamethylenediisocyanate, xylilenediisocyanate, isophoronediisocyanate, bis(isocyanatemethyl)cyclohexane, dicyclohexylmethanediisocyanate, dimethyldiphenylenediisocyanate, isopropylidenebiscyclohexylisocyanate, methylenebiscyclohexylisocyanate and the like.

Usually, the polyurethane resin to be modifed has number average molecular weight of 2,000 to 200,000, preferably 5,000 to 40,000. The polyurethane having too small molecular weight does not sufficiently improve durability of the magnetic layer. On the contrary, one having too large molecular weight increases viscosity of the magnetic coating composition.

The number of the phosphoric acid group to be incorporated in the polyurethane is one per number average molecular weight of 3,000 to 70,000, preferably on per molecular weight of 5,000 to 40,000. If the number of the phosphoric acid group is outside this range, the dispersbility of the magnetic powder in the binder resin is not satisfactorily improved.

When the modified polyurethane resin is used as the binder resin of the magnetic layer, not only the inherent durability of the unmodified polyurethane improved but also the dispersibility of the magnetic powder in the resin. In contrast, a mere mixture of the unmodified polyurethane and the phosphoric acid compound may improve the dispersibility of the magnetic powder in the resin but greatly deteriorate the durability of the magnetic layer.

The exact reason why the modified polyurethane has superior effects is not clearly known, but may be explained as follow:

In case of adding the phosphoric acid compound as a dispersing agent to the binder resin, although the affinity of the binder resin with the magnetic powder is increased by the strong polarity of the phosphoric acid compound so that the dispersibility of the magnetic powder is improved, the polarity of the phosphoric acid compound being too strong prevents adsorption of the magnetic powder by the resin so that the property of the polyurethane for imparting durability is not improved.

Since the modified polyurethane has the phosphoric acid group bonded to the backbone chain, the resin itself has good affinity with the magnetic powder so that the adsorption of the magnetic powder by the resin is not prevented. As a result, the inherent property of the polyurethane for imparting durability to the magnetic layer is preserved, and further the affinity of the resin for the magnetic powder improves the dispersibility of the magnetic powder in the resin. Particularly, the improvement of the dispersibility of the magnetic powder in the resin may be attributed to the above specified manner in which the phosphoric acid group has been introduced in the polymer molecule.

According to the present invention, the magnetic recording medium is produced in the same manner as the conventional magnetic recording medium. For example, the binder resin, the magnetic powder and optional additives are mixed in a suitable solvent to prepare the magnetic coating composition. The magnetic coating composition is then coated on the substrate such as a polyester film and dried. Then, its surface is treated by, for example, calendering.

As the magnetic powder, any conventional one may be used. Specific examples of the magnetic powder are powder of $\gamma$-$Fe_2O_3$, $Fe_3O_4$, an intermediate oxide of $\gamma$-$Fe_2O_3$ and $Fe_3O_4$, cobalt-containing $\gamma$-$Fe_2O_3$, cobalt-containing $Fe_3O_4$, Barium ferrite, lead ferrite, strontium ferrite, oxide magnetic powder such as $CrO_2$, metal iron, metal cobalt, metal nickel and alloys of two or more of these metals, alloys of one or more of these metals with a small amount of non-metallic element.

The optionally used additive may be any one of conventionally used ones and includes a lubricant, an abrasive, a dispersing agent, an antistatic agent and a filler.

The present invention will be hereinafter explained further in detail by following examples, in which parts are by weight unless otherwise indicated.

EXAMPLE 1

Following components were mixed in a ball mill for 72 hours to prepare a magnetic coating composition:

| Component | Parts |
|---|---|
| Co-containing $\gamma$-$Fe_2O_3$ (Average longer axis, 0.2 $\mu$m, average axis ratio, 1/10) | 600 |
| Modified terpolymer (IV) in which k = 91%, l = 3%, m = 5%, n = 1% and A = hydrogen (MW = 40,000) | 120 |
| Milistic acid | 2 |
| Cyclohexanone | 400 |
| Toluene | 400 |

The prepared composition was coated on a polyester base film having a thickness of 9 $\mu$m, dried to obtain a magnetic layer having a thickness of 4 $\mu$m and then calendered. The film having the magnetic layer was cut to produce a video tape having a predetermined width.

COMPARATIVE EXAMPLE 1

In the same manner as in Example 1 but using the unmodified terpolymer (a polymer of the formula (IV) in which k=91%, l=3%, m=6% and n=0%) having a molecular weight of 40,000 in place of the modified terpolymer, a video tape was produced.

COMPARATIVE EXAMPLE 2

In the same manner as in Example 1 but using a modified terpolymer (IV) having modified repeating units of the formula:

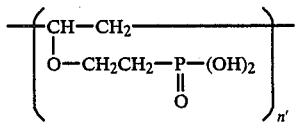

in which k=91%, l=3%, m=5% and n'=1% having a molecular weight of 40,000 in place of the modified terpolymer of the invention, a video tape was produced.

EXAMPLE 2

In the same manner as in Example 1 but further adding 60 parts of polyurethane elastomer (Pandex T-5250 manufactured by Dainippon Ink) in the coating composition, the video tape was produced.

EXAMPLE 3

In the same manner as in Example 1 but further adding 42 parts of the same polyurethane elastomer as used in Example 2 and 18 parts of trifunctional isocyanate compound having a low molecular weight (Colonate L manufactured by Nippon Polyurethane) on the coating composition, a video tape was produced.

COMPARATIVE EXAMPLE 3

In the same manner as in Comparative Example 1 but further adding 60 parts of the same polyurethane elastomer as used in Example 2 to the coating composition, a video tape was produced.

COMPARATIVE EXAMPLE 4

In the same manner as in Comparative Example 1 but further adding 42 parts of the same polyurethane elastomer as used in Example 2 and 18 parts of the same trifunctional isocyanate compound as used in Example 3 to the coating composition, a video tape was produced.

COMPARATIVE EXAMPLE 5

In the same manner as in Comparative Example 2 but further adding 60 parts of the same polyurethane resin as used in Example 2 to the coating composition, a video tape was produced.

COMPARATIVE EXAMPLE 6

In the same manner as in Comparative Example 2 but further adding 42 parts of the same polyurethane resin as used in Example 2 and 18 parts of the same trifunctional isocyanate compound as used in Example 3 to the coating composition, a video tape was produced.

EXAMPLE 4

In the same manner as in Example 1 but using the phosphoric acid modified polyurethane in place of the modified terpolymer in the coating composition, a video tape was produced.

The modified polyurethane used in this example was prepared by bonding one phosphoric acid group (namely, the group (I) in which both A were hydrogen atoms and n is zero) per 10,000 of molecular weight to a polyurethane resin having a molecular weight of 32,000 prepared by reacting polyester polyol, which had been prepared from 1,4-butanediol and adipic acid, with 4,4'-diphenylmethanediisocyanate.

COMPARATIVE EXAMPLE 7

In the same manner as in Example 4 but using an unmodified polyurethane resin which was used in Example 4 for the production of the modified polyurethane in place of the modified one in the coating composition, a video tape was produced.

EXAMPLE 5

In the same manner as in Example 4 but using 60 parts of the modified polyurethane and 60 parts of the same polyurethane resin as used in Example 2 in the coating composition, a video tape was pepared.

EXAMPLE 6

In the same manner as in Example 4 but using 55 parts of the modified polyurethane, 55 parts of the same polyurethane resin as used in Example 5 and 10 parts of the same trifunctional isocyanate compound as used in Example 3, a video tape was produced.

COMPARATIVE EXAMPLE 8

In the same manner as in Example 5 but using the same unmodified polyurethane as used in Comparative Example 7 in place of the modified polyurethane in the coating composition, a video tape was prepared.

COMPARATIVE EXAMPLE 9

In the same manner as in Example 6 but using the same unmodified polyurethane are used in Comparative Example 7 in place of the modified polyurethane in the coating composition, a video tape was produced.

EXAMPLE 7

In the same manner as in Example 4 but using 60 parts of the modified polyurethane and 60 parts of a phenoxy resin (PKHH manufactured by Union Carbide), a video tape was produced.

EXAMPLE 8

In the same manner as in Example 4 but using 55 parts of the modified polyurethane, 55 parts of the same phenoxy resin as used in Example 7 and 10 parts of the same trifunctional isocyanate compound as used in Example 6, a video tape was produced.

COMPARATIVE EXAMPLE 10

In the same manner as in Example 7 but using the same unmodified polyurethane as used in Comparative Example 7 in place of the modified polyurethane in the coating composition, a video tape was prepared.

COMPARATIVE EXAMPLE 11

In the same manner as in Example 8 but using the same unmodified polyurethane as used in Comparative Example 7 in place of the modified polyurethane in the coating composition, a video tape was produced.

EXAMPLE 9

In the same manner as in Example 4 but using 60 parts of the modified polyurethane and 60 parts of nitrocellulose (HIGI manufactured by Asahi Chemical), a video tape was produced.

EXAMPLE 10

In the same manner as in Example 4 but using 55 parts of the modified polyurethane, 55 parts of the same nitrocellulose as used in Example 9 and 5 parts of the same trifunctional isocyanate compound as used in Example 3, a video tape was produced.

COMPARATIVE EXAMPLE 12

In the same manner as in Example 9 but using the same unmodified polyurethane resin as used in Comparative Example 7 in place of the modified polyurethane in the coating composition, video tape was produced.

COMPARATIVE EXAMPLE 13

In the same manner as in Example 10 but using the same unmodified polyurethane resin as used in Comparative Example 7 in place of the modified polyurethane in the coating composition, a video tape was produced.

EXAMPLE 11

In the same manner as in Example 4 but using 60 parts of the modified polyurethane and 60 parts of vinyl chloride/vinyl acetate/vinyl alcohol terpolymer (VAGH manufactured by Union Carbide), a video tape was produced.

EXAMPLE 12

In the same manner as in Example 4 but using 55 parts of the modified polyurethane, 55 parts of the same terpolymer as used in Example 11 and 10 parts of the same trifunctional isocyanate compound as used in Example 3, a video tape was produced.

EXAMPLE 13

In the same manner as in Example 4 but using 60 parts of the modified polyurethane and 60 parts of the same modified terpolymer as used in Example 1, a video tape was produced.

EXAMPLE 14

In the same manner as in Example 4 but using 55 parts of the modified polyurethane, 55 parts of the same modified terpolymer as used in Example 1 and 10 parts of same trifunctional isocyanate compound as used in Example 3, a video tape was produced.

COMPARATIVE EXAMPLE 14

In the same manner as in Example 11 but using the same unmodified polyurethane as used in Comparative Example 7 in place of the modified polyurethane in the coating composition, a video tape was produced.

COMPARATIVE EXAMPLE 15

In the same manner as in Example 12 but using the same unmodified polyurethane as used in Comparative Example 7 in place of the modified polyurethane, a video tape was produced.

COMPARATIVE EXAMPLE 16

In the same manner as in Comparative Example 7 but using the same unmodified terpolymer as used in Example 11 in place of the unmodified polyurethane, a video tape was produced.

COMPARATIVE EXAMPLE 17

In the same manner as in Comparative Example 7 but using 50 parts of the unmodified polyurethane, 48 parts of the same terpolymer as used in Example 11, 10 parts of the same trifunctional isocyante as used in Example 3 and 12 parts of phoshoric ester (Garfack RE-610 manufactured by Toho Chemical), a magnetic recording tape was produced.

The thus produced video tapes were examined for squareness ratio (Br/Bs) and saturation flux density (G) as the magnetic characteristics, surface roughness of the magnetic layer, recording characteristics in the short wavelength range, durability, heat resistance and chemical resistance of the video tape according to the following manners (except the magnetic characteristics which were examined by conventional manners):

SURFACE ROUGHNESS

Average roughness (Ra) along the center line of the magnetic layer was measured by a tracer method under following conditions:
Tracer rate: 0.3 mm/sec.
Cut off: 0.08 mm.

RECORDING CHARACTERISTICS

Output of the video tapes at each frequency shown in Table was measured and represented as a difference from the output of the video tape produced in Comparative Example 1 (0 dB).

DURABILITY

The video tape with a length comparable to 120 minute recording was installed in a video tape set, and traveled back and forth in a VHS type video tape recorder at a tape speed of 3.33 cm/sec. with head load of 30 g to measuring the traveling number till blinding occurred. The results are evaluated by following criteria:

⊙ : No blinding occurred after 100 time traveling.
0: Blinding occurred after 60 to 80 time travelling.
Δ: Blinding occurred after more than 20 and less than 60 time traveling.

HEAT RESISTANCE

The video tape was cut in 1.5 cm long and wound on a glass tube of 36 mm in diameter under load of 1 kg and kept at 60° C., 80%RH for 48 hours. Thereafter, sticking degree of the surface of the magnetic layer was evaluated by following criteria:
◎: No sticking was observed.
0: Slight sticking was observed.
Δ: Fair sticking was observed.
X: Severe sticking was observed.

CHEMICAL RESISTANCE

On the surface of the magnetic layer, a drop of tetrahydrofuran was dropped and, after one minute, wiped off. The condition of the surface of the magnetic layer was observed and evaluated by following criteria:
◎ : No change as observed.
0: Slight change was observed.
Δ: A part of the surface as melt and peeled off.
X: Whole surface area was melt and peeled off.
The results are shown in following Table.

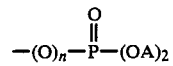

wherein A is a hydrogen atom, an alkali metal atom or a hydrocarbon group, and n is 0 or 1 is directly bonded to the backbones of each of said polymers, wherein said polyurethane has one phosphoric acid group per number average molecular weight of 3,000 to 70,000.

2. A magnetic recording medium according to claim 1, wherein n in the formula (I) is zero.

3. A magnetic recording medium according to claim 1, wherein n in the formula (I) is one.

4. A magnetic recording medium according to claim 1, wherein the binder resin contains at least 10% by weight of the modified polymer.

5. A magnetic recording medium according to claim

TABLE

| Example No. | Squareness ratio (Br/Bs) | Saturation flux density Bs (G) | Surface roughness (μm) | Recording characteristics (dB) | | | Durability | Heat resistance | Solvent resistance |
| --- | --- | --- | --- | --- | --- | --- | --- | --- | --- |
| | | | | 30 KHz | 60 KHz | 80 KHz | | | |
| 1 | 0.81 | 1,950 | 0.0015 | +1.5 | +1.5 | +1.0 | X | Δ | X |
| Com. 1 | 0.76 | 1,750 | 0.0030 | 0 | 0 | 0 | X | X | X |
| Com. 2 | 0.78 | 1,800 | 0.0025 | 0 | 0 | +0.5 | X | X | X |
| 2 | 0.82 | 1,950 | 0.0015 | +1.5 | +1.5 | +1.0 | Δ | Δ | X |
| 3 | 0.83 | 1,900 | 0.0010 | +2.0 | +1.5 | +1.0 | ◎ | ◎ | ◎ |
| Com. 3 | 0.75 | 1,700 | 0.0030 | 0 | −0.5 | −0.5 | Δ | Δ | X |
| Com. 4 | 0.75 | 1,750 | 0.0035 | −0.5 | −0.5 | −1.0 | ◎ | ◎ | ◎ |
| Com. 5 | 0.77 | 1,800 | 0.0030 | 0 | 0 | −0.5 | Δ | Δ | Δ |
| Com. 6 | 0.78 | 1,800 | 0.0035 | 0 | 0 | −0.5 | ◎ | ◎ | ◎ |
| 4 | 0.83 | 1,980 | 0.0020 | +3.0 | +2.0 | +1.5 | Δ | Δ | X |
| Com. 7 | 0.68 | 1,550 | 0.0080 | −2.0 | −2.0 | −2.5 | Δ | Δ | X |
| 5 | 0.78 | 1,860 | 0.0015 | +0.5 | +0.5 | +0.5 | O | Δ | X |
| 6 | 0.79 | 1,870 | 0.0017 | +1.5 | +1.5 | +1.0 | ◎ | O | ◎ |
| Com. 8 | 0.73 | 1,690 | 0.0045 | −2.0 | −2.0 | −1.3 | Δ | X | X |
| Com. 9 | 0.72 | 1,670 | 0.0042 | −2.5 | −2.5 | −3.0 | ◎ | O | ◎ |
| 7 | 0.79 | 1,880 | 0.0020 | +1.0 | +0.5 | +0.5 | O | O | Δ |
| 8 | 0.79 | 1,920 | 0.0020 | +1.0 | +1.0 | +0.5 | ◎ | ◎ | ◎ |
| Com. 10 | 0.69 | 1,650 | 0.0060 | −2.0 | −2.0 | −2.5 | O | O | X |
| Com. 11 | 0.70 | 1,630 | 0.0040 | −1.0 | −1.0 | −2.0 | ◎ | ◎ | ◎ |
| 9 | 0.82 | 1,930 | 0.0010 | +3.0 | +2.5 | +2.5 | X | Δ | X |
| 10 | 0.81 | 1,910 | 0.0010 | +3.0 | +2.5 | +2.0 | ◎ | ◎ | ◎ |
| Com. 12 | 0.77 | 1,860 | 0.0030 | +0.5 | +0.5 | +0.5 | X | Δ | X |
| Com. 13 | 0.77 | 1,850 | 0.0030 | +0.5 | +0.5 | 0 | ◎ | ◎ | ◎ |
| 11 | 0.79 | 1,910 | 0.0020 | +1.0 | +1.0 | +0.5 | X | Δ | X |
| 12 | 0.79 | 1,910 | 0.0020 | +1.0 | +1.0 | +0.5 | ◎ | ◎ | ◎ |
| 13 | 0.83 | 1,920 | 0.0013 | +3.0 | +3.0 | +2.5 | Δ | O | X |
| 14 | 0.83 | 1,950 | 0.0010 | +2.5 | +2.5 | +2.0 | ◎ | ◎ | ◎ |
| Com. 14 | 0.75 | 1,760 | 0.0032 | 0 | +0.5 | +0.5 | X | Δ | Δ |
| Com. 15 | 0.75 | 1,750 | 0.0032 | 0 | 0 | 0 | ◎ | O | O |
| Com. 16 | 0.76 | 1,750 | 0.0030 | 0 | 0 | 0 | X | X | X |
| Com. 17 | 0.80 | 1,890 | 0.0032 | +1.0 | +1.0 | +0.5 | X | Δ | Δ |

What is claimed is:

1. A magnetic recording medium comprising a substrate and a magnetic layer coated on the substrate which comprises a magnetic powder and a binder resin, wherein said binder resin comprises a modified polymer selected from the group consisting of a polymer having a backbone chain comprising a vinyl chloride/vinyl acetate/vinyl alcohol terpolymer and a polymer having a backbone chain comprising polyurethane, in which a phosphoric acid group of the formula:

$$-(O)_n-\overset{\overset{O}{\|}}{P}-(OA)_2 \qquad (I)$$

1, wherein the magnetic layer further contains a trifunctional isocyanate compound having a low molecular weight.

6. A magnetic recording medium according to claim 5, wherein the amount of the trifunctional isocyanate compound 1 to 60 parts by weight per 100 parts of the modified polymer.

7. A magnetic recording medium according to claim 1, wherein the polymer is the modified terpolymer.

8. A magnetic recording medium according to claim 7, wherein the terpolymer is of the formula:

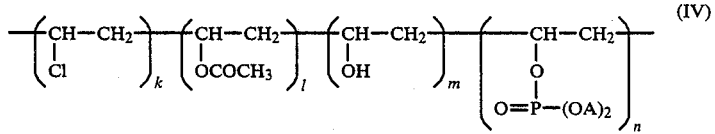

wherein k, l, m and n satisfy following equation:

$$0.01 \leq (l+m+n)/(k+l+m+n) \leq 0.6.$$

9. A magnetic recording medium according to claim 8, wherein k, l, m and n in the formula (IV) satisfy following equation:

$$0.005 \leq (l+m+n)/(k+l+m+n) \leq 0.2.$$

10. A magnetic recording medium according to claim 8, wherein the substituent A in the formula (IV) is a hydrogen atom.

11. A magnetic recording medium according to claim 7, wherein the terpolymer has a number average molecular weight of 5,000 to 150,000.

12. A magnetic recording medium according to claim 1, wherein the polymer is the modified polyurethane.

13. A magnetic recording medium according to claim 12, wherein the modified polyurethane has a phosphoric acid group per number average molecular weight of 5,000 to 40,000.

14. A magnetic recording medium according to claim 12, wherein the polyurethane has a number average molecular weight of 2,000 to 200,000.

15. A magnetic recording medium according to claim 14, wherein the polyurethane has a number average molecular weight of 5,000 to 40,000.

16. A magnetic recording medium according to claim 12, wherein the binder resin comprises at least 3% by weight of the polyurethane.

17. A magnetic recording medium according to claim 1, wherein the binder resin comprises at least 3% by weight of the modified polymer.

18. A magnetic recording medium according to claim 5, wherein the binder resin comprises at least 3% by weight of the modified polymer.

19. A magnetic recording medium according to claim 5, wherein the binder resin comprises at least 10% by weight of the modified polymer.

* * * * *